J. W. BEATLEY.
Process of and Apparatus for the Manufacture of Illuminating Gas.
No. 242,181.
2 Sheets—Sheet 1.
Patented May 31, 1881.
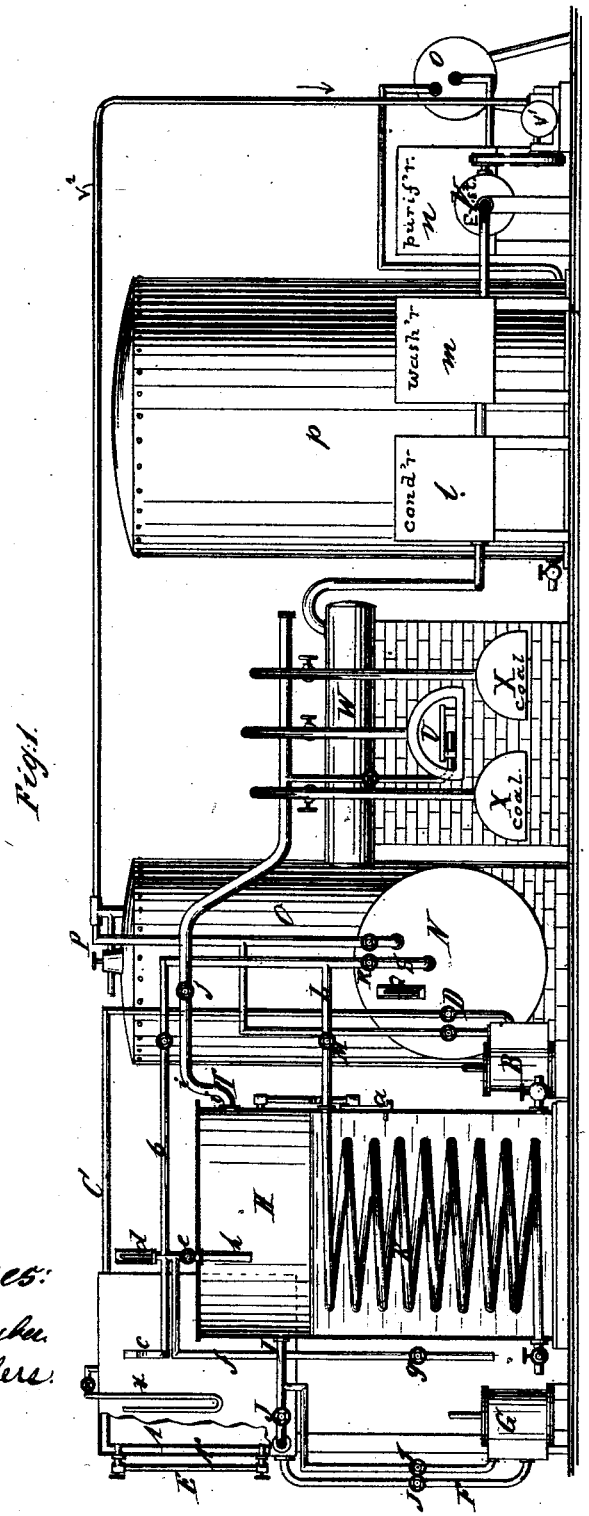

J. W. BEATLEY.
Process of and Apparatus for the Manufacture of Illuminating Gas.
No. 242,181.  Patented May 31, 1881.
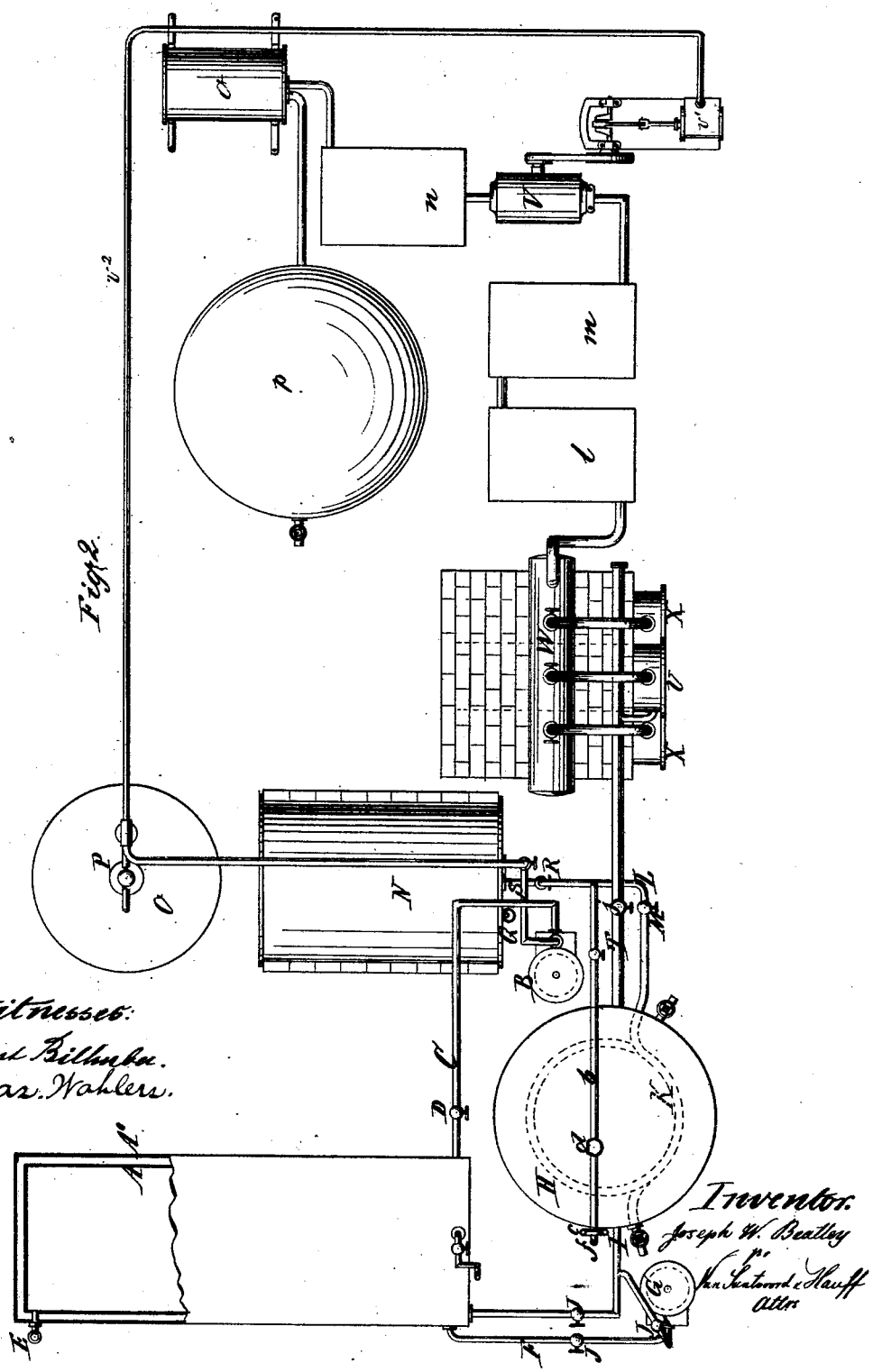

UNITED STATES PATENT OFFICE.

JOSEPH W. BEATLEY, OF BROOKLYN, NEW YORK.

PROCESS OF AND APPARATUS FOR THE MANUFACTURE OF ILLUMINATING-GAS.

SPECIFICATION forming part of Letters Patent No. 242,181, dated May 31, 1881.

Application filed February 19, 1875.

*To all whom it may concern:*

Be it known that I, JOSEPH WILLIAM BEATLEY, of the city of Brooklyn, in the county of Kings and State of New York, have invented certain new and useful Improvements in the Process of and Apparatus for the Manufacture of Illuminating-Gas; and I do hereby declare that the following is a full and clear description of the same, reference being had to the drawings, in which—

Figure 1 represents a side elevation, partly in section, and Fig. 2 a plan or top view, making a part of this my specification, in which similar letters indicate corresponding parts in both figures.

The nature of my invention consists in an improvement in the process of manufacturing illuminating-gas from liquid hydrocarbons by the commingling of superheated steam and hydrocarbon vapors by bringing superheated steam into direct contact with the surface of hydrocarbon liquid in a closed vessel heated by steam, and by decomposing the said commingled vapors into a fixed commercial gas in red-hot retorts.

My invention further consists in the combination of a closed still, in which liquid hydrocarbons are evaporated by the diffusion of superheated steam upon the surface of the liquid, with a vapor-escape pipe provided with means for retarding the exit of the vapors in their passage from the still to the fixing-retorts, thereby assisting to regulate the evaporation of the liquid and the rarefying of the vapor and its exit from the still.

My improvements for the production of the light and rarefied vapors above specified, and their conversion into gas, consist, preferably, of a closed vessel or still connected with a steam-boiler, and a superheater containing a liquid hydrocarbon, and a steam-coil situated below the surface of the said liquid, for the purpose of heating it; also, having an inlet-pipe passing through its top, for the admission and distribution of the superheated steam upon the surface of the liquid, and inlet and outlet pipes connecting with a storage or supply tank, and with highly-heated retorts for the conversion of the commingled vapors into gas.

In view of the nature of the invention above mentioned I illustrate in the drawings forming part and parcel of this specification one of the means by which such results may be produced.

The still H is a closed metallic cylindrical vessel, vertically set up, covered with asbestus or other non-conducting material, and containing a liquid hydrocarbon, about three-eighths of the cubical contents of the still being reserved above the said liquid for a vapor-chamber, in which are commingled the superheated steam and the hydrocarbon vapor evaporated from the liquid hydrocarbon by the action of the superheated steam upon its surface. The still is provided with pressure-gages, as at $c$, thermometers, as at $d$, a condensation drip-pipe, $f$, with valve $g$, a valve, $e$, to regulate the supply of the superheated steam, gages to exhibit the height and appearance of the contents, and a thermometer, $a$, to ascertain their temperature. Each still, when more than one is in use, also contains a steam coil-pipe, K, of such dimensions as to be situated wholly within the body of the liquid, and so placed with reference to the shell of the still as to uniformly heat the liquid to the required temperature without distilling it or producing connective currents therein. The coil is a metallic tube placed in concentric circles in the still, having an inlet-pipe, L, leading from the superheater N, and an outlet-pipe at the bottom of the coil and passing through the side of the still. The inlet-pipe has a valve, M, the outlet also having a valve to regulate the inlet and outlet flow of steam to and from said coil, and to shut it off entirely when not required, said steam being supplied from the superheater N.

The inlet-pipe, if so desired, may be connected with the pipe leading directly from the boiler, so as to admit common steam into the coil, as is obvious to any one skilled in the art to which this invention appertains. The coil is used to bring the temperature of the liquid contents of the still up to the requisite standard, and to maintain it at that point, as occasion may require.

The hydrocarbon liquid is stored in one or more wooden or metallic tanks, A, located at any convenient situation upon or under the ground, or under the water, covered and protected by any suitable inclosure or jacket $A^0$, when required, which may be heated by steam through an iron coil, or cooled by cold water to preserve an equilibrium of temperature in the tank at all seasons of the year. I fill the said tanks with hydrocarbon liquids, or distillates thereof, by means of a steam-pump, B, which draws such liquids or distillates from the vessel or other means of transport, (if gravity cannot be employed for the purpose,) and delivers the same into the upper interior part of said tanks by the inlet-pipe C, which is provided with a valve, D. I gage the contents of the said tanks by an upright gage, E, by which I am enabled to ascertain the quantity filled into and withdrawn from the tanks; and I provide each tank with a safety-valve or siphon, $x$, to permit the escape of air or vapor. I convey the contents of said tanks to the still H by means of an outlet-pipe, F, which extends from the lower side of the tank to the steam-pump G, and thence by the pipe I to the still or stills, or directly, by means of gravity, through the pipe I leading direct from the tank to the still. The pipes F and I have valves J for shutting off or regulating the supply of the liquid to the still. The inlet or supply pipe I to the still discharges the hydrocarbon liquid into the still above the maximum level of the liquid to maintain the liquid at a constant level, with but slight variation, and without being disturbed so as to cause any motion in its contents.

The boiler O, having safety-valve P, may have a pipe, $r^2$, directly leading from it to the engine $r'$ working the exhauster V, and may have a pipe leading to the coil K, and has a pipe leading to the superheater N.

Q indicates a pyrometer.

The pipe S, having a valve, R, conveys superheated steam through a branch pipe, L, to the coil K, and through another pipe, $b$, and nozzle $h$, to the interior upper portion of the still H. The valve $c$ regulates the flow of the superheated steam into the still. The nozzle $h$ enters the still through the top at a point nearer to the liquid-supply pipe I than to the vapor-escape pipe T, and projects vertically downward to a point below the outlet of the said vapor-escape pipe and above the surface of the liquid, the length being in proportion to the diameter and height of the still, the purpose being to lightly and thoroughly diffuse the superheated steam down upon the surface of the liquid contents of the still without agitating or overheating them, and to evaporate the liquid from its upper surface, thereby avoiding heavy and irregular vapors and the evil effects attendant upon them. With this view the superheated steam is admitted into the still in regulated quantity and temperature without pressure or force, and diffused lightly over and upon the surface of the liquid. This causes the production of a very volatile hydrocarbon vapor of uniform quality and quantity. The commingled superheated steam and hydrocarbon vapor are carried off from the still in a highly rarefied state. The temperature, density, undisturbed condition, and quiet evaporation of the liquid are maintained continuously and unintermittingly. The superheated steam not only vaporizes the liquid and expands and rarefies the vapor, but by its high temperature and dryness so heats, combines with, and retains them that they do not condense and separate on their passage to the retorts.

The outlet of the vapor-escape pipe from the still T is placed not less than six inches below the top of the still, the pipe being covered with asbestus or other non-conducting material. This position of the pipe T slightly retards the egress of the commingled vapors. The pipe T has also two or more bends or angles, $i$, which further retard the escape of the vapors. This mechanical resistance produces a light and uniform back-pressure and a diffusion of the vapor in the vapor-retaining chamber, preventing it from being drawn away too rapidly, regulating the evaporation of the liquid, equalizing the density of the vapor, rarefying it by more intimate contact with the superheated steam, and produces sufficient expansive power in the vapor to cause it to pass without force or pressure through the pipes to the retorts. The pipe T has a valve, $j$, and is without any internal check or obstacle, thus permitting the vapors at all times to pass with perfect freedom, and, without undue resistance, to throw a back-pressure upon the still and accumulate vapors therein. The vapor-escape pipe T connects with one or more converting or fixing retorts, U. The pipe enters the retort U through its mouth-piece, whence the vapors pass through a brick or other flue on the bottom of the retort to the rear end and return through the upper part thereof, being converted in their passage into a fixed illuminating-gas.

The retorts are operated without mechanical pressure by dispensing with the dip-pipe seal, and their contents are withdrawn by an exhauster, the retorts and hydraulic main being thus relieved from all back-pressure. The gas passes from the hydraulic main W through the condensers $l$, washers $m$, purifiers $n$, exhauster V, and station-meter $o$, to the holder $p$, from which it is distributed or delivered into the street-mains for public use with the converting retort or retorts U and hydraulic main W. I also combine, when coal-gas is made, one or more coal-gas retorts, X, the stand-pipes of which connect with the hydraulic main, and the crude coal-gas formed in the retorts X is mixed in a heated state in the hydraulic main with the gas produced in the converting-retorts U. During this operation all the retorts and the hydraulic main are kept free from back or intermittent pressure, and the combined gases pass through the ordinary condensers, washers, exhauster, purifiers, station-meter, holder, governor, and street-mains without obstructing the purifiers and without increase of condensation in the drips.

I do not restrict myself to the apparatus herein described for the manufacture of illuminating-gas by the use and employment of superheated steam and hydrocarbon vapors, as I also use such other means and apparatus as will permit and enable the process and principle herein made known and described, and produce the same results, to be employed.

I do not here broadly claim a still with a steam-pipe entering from above and projecting into the still. The use of steam of ordinary temperature would not effect the object attainable by my invention, nor would the introduction of steam by a simple pipe be sufficient. The invention herein described and claimed contemplates the use of superheated steam only and a distribution thereof, and an apparatus only in which superheated steam is produced and distributed; but What I do claim, and desire to secure by Letters Patent, is—

1. The process of manufacturing illuminating-gas by bringing superheated steam into direct contact with the surface of hydrocarbon liquids in a closed vessel or still heated by steam, thereby evaporating the said hydrocarbon liquids, and then conducting the resultant commingled vapors into a highly-heated retort, and therein converting them into a fixed gas, in the manner and for the purpose herein described.

2. A closed still constructed as described and having the exit-pipe, provided with additional means for retarding the exit of the vapors in their passage from the still to the fixing-retort, substantially in the manner herein set forth.

3. In combination with still H, its liquid-supply pipe I, coil K, and steam-pipes L $b$ $h$, a supply-tank, A, provided with a jacket, $A^0$, in the manner and for the purpose herein described.

4. The combination of the still H, superheater N, steam-pipes L $b$ $h$, coil K, liquid-supply pipe I, vapor-escape pipe T, superheated steam and hydrocarbon-liquid gas-retort U, coal-gas retort X, hydraulic main W, condenser $l$, washer $m$, exhauster V, and purifier $n$, in the manner and for the purpose herein described.

In testimony that I claim the foregoing I have hereunto set my hand and seal this 16th day of February, 1875.

JOSEPH W. BEATLEY. [L. S.]

Witnesses:
JOS. PEARSON GILL,
WM. H. GRENELLE.